United States Patent [19]

Matsumoto

[11] 4,390,918
[45] Jun. 28, 1983

[54] OPERATING MODE SWITCHING MECHANISM FOR A TAPE RECORDER

[75] Inventor: Shigeru Matsumoto, Yokohama, Japan

[73] Assignee: Victor Company of Japan, Limited, Yokohama, Japan

[21] Appl. No.: 236,632

[22] Filed: Feb. 20, 1981

[30] Foreign Application Priority Data

Feb. 22, 1980 [JP] Japan .................................. 55-20405

[51] Int. Cl.³ .............................................. G11B 15/10
[52] U.S. Cl. ..................................... 360/137; 360/105
[58] Field of Search .................... 360/137, 105, 75, 69, 360/74.2, 74.3, 61, 71, 72.3

[56] References Cited

U.S. PATENT DOCUMENTS

| | | | |
|---|---|---|---|
| 4,225,894 | 9/1980 | Fulukawa | 360/137 |
| 4,232,349 | 11/1980 | Kobayashi | 360/105 |
| 4,334,253 | 6/1982 | Motoyama et al. | 360/137 |
| 4,336,560 | 6/1982 | Matsumoto | 360/137 |

*Primary Examiner*—Alfred H. Eddleman
*Attorney, Agent, or Firm*—Lowe, King, Price & Becker

[57] ABSTRACT

An operating mode switching mechanism for a tape recorder for effecting various operations in response to operation of manually operating keys comprises a single solenoid for causing a rotary wheel to start rotating so that various operations are selectively performed depending on the duration for which the solenoid is energized by moving a carrier plate carrying thereon an electromagnetic transducer head, between first and second positions. The rotational angle of the rotary wheel is detected by a photo sensing means, and the detected angle will be used in an electrical circuit in which three different pulses for energizing the solenoid are selectively produced in accordance with the selected operating key and the detected rotational angle of the rotary wheel. Energization interval of the solenoid is, thus synchronized with the rotation of the solenoid thereby providing accurate operating mode switching operations.

13 Claims, 7 Drawing Figures

OPERATING MODE SWITCHING MECHANISM FOR A TAPE RECORDER

FIELD OF THE INVENTION

This invention generally relates to tape recording and reproducing apparatus, and more particularly, the present invention relates to an operating mode switching mechanism for tape recorders, which mechanism is arranged to operate by energizing a single solenoid.

BACKGROUND OF THE INVENTION

Electrically operated mode switching mechanisms are often used in tape recorders in place of conventional mechanically controlled mode switching mechanisms. Since a mode switching mechanism of the electrically operated type permits selection of a desired mode in response to a featherly touch on the associated key or button, it has gained wide popularity among users. However, the conventional electrically operated mode switching mechanism employs a plurality of solenoids which are associated with different operating keys. This requires a substantial amount of power for operating various mechanical elements particularly because the circuitry is designed so that the solenoids remain energized during the time the recorder is being operated. Although this continuous power operation may find use in applications where the power is supplied from an external A.C. source, application to battery powered portable tape recorders is not possible due to its power consumption. Furthermore, the use of a plurality of solenoids results in a relatively large size and a high manufacturing cost.

The inventor of the present invention divised, prior to the present invention, a pulse-operated mode switching mechanism for tape recorders and filed patent applications Ser. No. 54-38006 in Japan, 134,990 in the United States, now U.S. Pat. No. 4,336,560, 8010392 in United Kingdom, and P 3012196.1 in West Germany. According to the technique of the prior applications by the present inventor, a pulse operated mode switching mechanism for tape recorders comprises a single solenoid which is operated in response to a pusle of different periods depending on the function of the operating key. A rotary control wheel is driven by a motor to provide a 360 degree revolution in response to the energization of the solenoid. Electromagnetic transducer head(s) and an erase head are mounted on a carrier plate which is movable between a first position in which the heads are remote from the magnetic tape and a second position in which the tape is in cotact with the heads. A pinch roller or idler is arranged to be biased toward the capstan to drive the tape when the carrier plate assumes the first position. The carrier plate is moved from the first to second position by the rotation of the rotary control wheel when the solenoid is energized for an interval greater than a first predetermined interval so that playback or recording is performed. Energization of the solenoid for an interval smaller than a second predetermined interval, which is smaller than the first predetermined interval, during playback or recording mode causes the carrier plate to return to the first position so that movement of the tape terminates to assume stop mode. On the other hand, when the solenoid is energized for an interval greater than the second interval but smaller than the first interval, the carrier plate is arranged to be locked at an intermediate position between the first and second positions causing the idler to be remote from the capstan, resulting in pause operation. Namely, in accordance with the technique of the prior invention of the present inventor, the position of the carrier plate is controlled by the rotation of the control wheel in response to the operation of the solenoid, where the duration of the pulse applied to the solenoid determines the mode to be assumed. To this end one of three pulses having different intervals is selected in accordance with a selected key, such as playback key, record key, stop key, fast forward key, rewind key, and pause key. The three different intervals are all predetermined so that desired operations are respectively performed.

However, the above-described pulse-operated mode switching mechanism has suffered from the following disadvantages and drawbacks. Namely, timing error between the operation of the solenoid and the control wheel is apt to occur because of the variations in the predetermined intervals, and because of variations in the rotational speed of the control wheel. In detail, each of the predetermined intervals is defined by a time constant circuit having resistor(s) and capacitor(s), and it is difficult to obtain a uniform time constant throughout a number of cirucits because of variations in resistances and capacitances. In addition, when a D.C. motor is used for driving the control wheel, the rotational speed of the control wheel is apt to vary as the amount of load varies. The above-mentioned timing error corresponds to the product of the error of the predetermined interval and the error of the rotational speed of the control wheel.

The timing error between the operating period of the solenoid and rotational angle of the control wheel results in malfunction of the operating mode switching mechanism, and in the worst case, changeover between operating modes cannot be performed.

SUMMARY OF THE INVENTION

The present invention has been developed in the order to remove the disadvantages and drawbacks inherent to the above-mentioned pulse-operated mode switching mechanism for tape recorders.

It is, therefore, an object of the present invention to provide an operating mode switching mechanism for a tape recorder which mechanism is capable of performing accurately mode switching operations irrespectively of the variations in energizing intervals of a single solenoid and of the variations in the rotational speed of a rotary control wheel, which controls the position of the carrier plate carrying the magnetic heads, in response to the operation of the solenoid.

A feature of the present invention is to employ an arrangement that the single solenoid is energized for one of three different intervals which are respectively defined by the rotational angle of the control wheel which is driven by a motor to move the carrier plate between two positions.

In accordance with the present invention there is provided an operating mode switching mechanism for a tape recorder having a movable carrier member carrying thereon an electromagnetic transducer and movable between first and second positions, a tape driving mechanism arranged to drive a magnetic tape at a constant speed when said carrier member assumes said second position, a plurality of manually operating keys for effecting various oeprations, and a motor, comprising: (a) a single solenoid arranged to be energized by pulses applied thereto in response to the operation of said operating keys; (b) a rotary wheel; (c) means for locking said rotary wheel at a predetermined angular position and for unlocking the same in response to the energization of said solenoid; (d) means for rotating said rotary wheel after unlocked so that said rotary wheel provides a 360 degree revolution from said predetermined angular position; (e) means responsive to the rotation of said roatry wheel for causing said carrier member to move from said first position to said second position against a biasing force only when said solenoid is being energized until said rotary wheel is rotated by a first predetermined angle; (f) means responsive to the rotation of said rotary wheel for locking said carreir member in an intermediate position between said first and second positions only when said solenoid is being energized during the time said carrier member assumes said second position until said rotary wheel is rotated by a second predetermined angle which is smaller than said first predetermined angle; (g) means responsive to the rotation of said rotary wheel for causing said carrier member to move from said second position to said first position when said solenoid is being energized until said rotary wheel is rotated by a third predetermined angle which is smaller than said second predetermined angle; (h) means for detecting the rotational angle of said rotary member; and (i) means responsive to the detected angle of said rotary wheel for deenergizing said solenoid when said rotary wheel is rotated by one of said first to third predetermined angles, which has been selected in accordance with said selected operating key.

BREIF DESCRIPTION OF THE DRAWINGS

The object and features of the present invention will be more readily apparent from the following detailed description of the preferred embodiment taken in conjunction with the accompanying drawings in which.

The same elements are designated at like numerals throughout the drawings.

DETAILED DESCRIPTION OF THE PREFERRED EMBODIMENT

Figure 1:
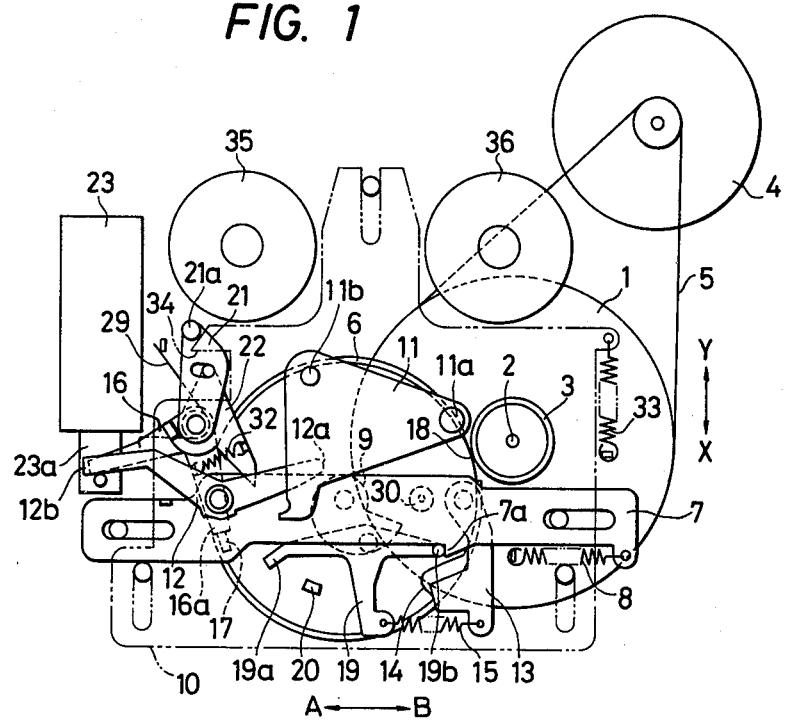
FIG. 1 is a schematic top plan view of a tape recorder to which one embodiment of the present invention is adapted; the tape recorder being shown to be in stop mode.

Reference is made to FIG. 1 which shows a schematic top plan view of a tape recorder to which an embodiment of the present invention is adapted. The operating mode switching mechanism for a tape recorder according to the present invention generally comprises a mechanical control portion shown in FIG. 1 and an electrical control portion shown in FIG. 6 which will be described hereinlater. The tape recorder is arragned to switch or change its operating modes, such as playback, stop, fast forward etc. by manipulating a selected key or button which is normally-open electrical switch.

In FIG. 1, a pay off or supply reel wheel 35 and a take up reel wheel 36 are shown, and these wheels 35 and 36 are respectively arranged to be driven by an unshown motor. A numeral 1 is a flywheel; 2, a capstan equipped with the flywheel; 3, a flywheel gear coaxially connected to the capstan 2, and these members 1 to 3 are rotatably supported on an unshown chassis where the flywheel 1 is driven via a belt 5, which is partially wrapped around the flywheel 1, by means of a motor 4. A rotary control wheel 6 has a toothed portion along the periphery thereof except for a portion, which is referred to as a nontoothed portion 18. The toothed portion of the control wheel 6 is arranged to be engaged with the flywheel gear 3. Since the diameter of the control wheel 6 is much greater than that of the flywheel gerar 3, the control wheel 6 is driven at a reduced speed. The control wheel 6 will be rotated by the flywheel gear 3 only when the toothed portion thereof is engaged with the flywheel gear 3 so that mode switching operation is performed as will be described later using a driving force from the control wheel 6. The control wheel 6 may be called, therefore, a dirve gear. The control wheel 6 is rotatably mounted on the chassis, and is normally prevented from rotating by a stop lever 16 as will be described later. A slide bar 7 is slidably mounted on the chassis, and is movable in the directions A and B indicated by arrows. The slide bar 7 is biased toward the direction A by a force of a return spring 8 which is interposed between the slide bar 7 and the chassis. The slide bar 7 has a rotary member or pin 30 which projects from the rear surface thereof. The rotary member 30 is positioned so that it comes into contact with the periphery of a cam 9 connected to or integrally formed with the control wheel 6. Although the rotary member 30 is shown to be remote from the cam 9 in FIG. 1, when the slide bar 7 is moved to the direction A, the rotary member 30 abuts against the cam 9, and thus the slide bar 7 will move in the direction B against the force of the return spring 8 as the cam 9 rotates clockwise together with the control wheel 6.

Figure 4:
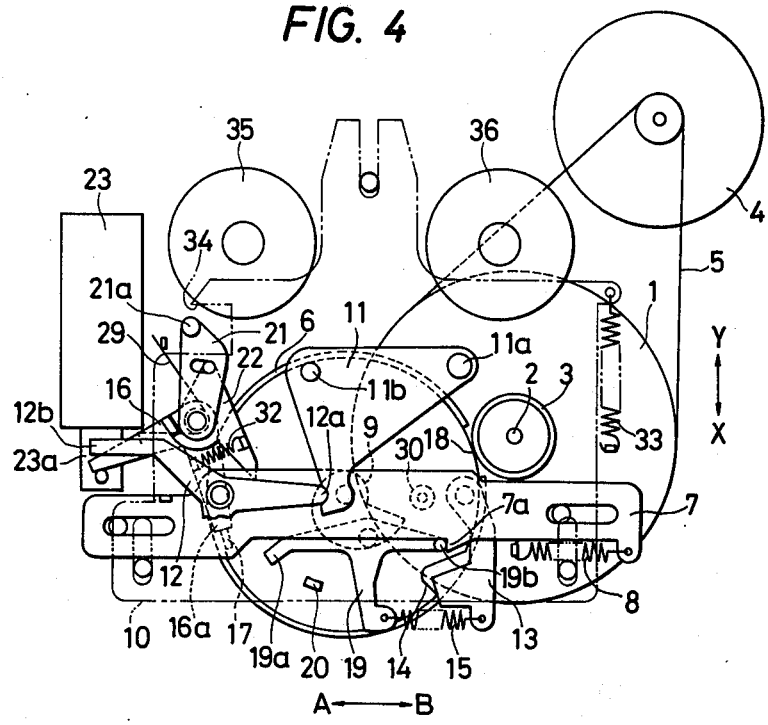
FIG. 4 is a schematic top plan view of the tape recorder in playback or record mdoe.

A carrier plate 10 is slidably mounted on the chassis to move in the direcitions X and Y indicated by arrows. The carrier plate 10 carries magnetic transducer head(s), such as record/reproduce head, and an erase haed, which are not shown for simplicity. A pinch roller or idler which is also not shown, is arranged to be pressed toward the capstan 2 when the carrier plate 10 is moved in the direction Y. The position of the carrier plate 10 shown in FIG. 1 is referred to as a first position and the position of hte same of FIG. 4 is referred to as a second position. Namely, the first position of FIG. 1 is a stop/fast forward/rewind position, while the second posiiton of FIG. 4 is a playback/record position. With the carreir plate 10 at the first position, the magnetic heads are remote from the tape, while the idler is spaced from the capstan 2. On the other hand, when the carrier plate 10 is at the second position, the magnetic heads are in contact with the tape and the tape is engaged between the capstan 2 and the idler so that the tape is driven at a constant playback or recording speed.

The above-mentioned carrier plate 10 is moved by the rotational movement of a bell crank 11 pivoted at a point 11b. In detail, the bell crank 11 has, at one end, a projection or pin 11a which is received in a through-hole made in the carrier plate 10. The carrier plate 10 is biased in the direction X to normally assume the first position by a force of a return spring 33 which is connected to the chassis. The bell crank 11 can be rotated by the movement of the slide bar 7 against the spring 33 connected to the carrier plate 10 as will be described later so that the carrier plate 10 moves between the first and second positions in the directions X and Y.

An arm 12 is rotatably mounted on the slide bar 7, and has a left end 12b arranged to be pulled by a plunger 23a of a solenoid 23 so that the arm 12 rotates clockwise. The right end 12a of the arm 12 is arranged to be engaged with the bell crank 11 to rotate the same counterclockwise as the slide bar 7 moves in the direction B as will be described later. The structure of the arm 12 is partially shown in FIG. 1 for simplicity. Furthermore, although the arm 12 is shown to be a single member in FIG. 1, it actually comprises an arm body 12c and a lost motion member 12d as shown in FIG. 2.

Figure 2:
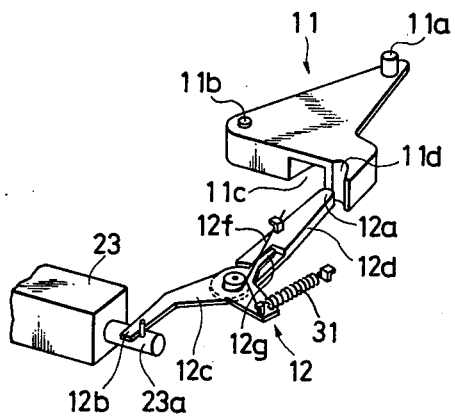
FIG. 2 is an enlarged perspective view showing the relationship between the arm and the bell crank both shown in FIG. 1.

FIG. 2 is an enlarged perspective view showing the relationship between the arm 12 and the bell crank 11. The arm body 12c and the lost motion member 24 are coaxially mounted on the slide bar 7 of FIG. 1. The arm body 12c is biased in the counterclockwise direction by means of a return spring 31 which is connected to the slide bar 7 at its one end, while the lost motion member 12d is biased in the clockwise direction by means of a spring 12f connected between the lost motion member 12d and the arm body 12c. The arm body 12c has a projection 12g which is arranged to rotated the lost motion member 12d counterclockwise when the arm body 12c rotates counterclockwise. The lost motion member has a tip portion which corresponds to the above-mentioned right end 12a of the arm 12. When the arm body 12c rotates clockwise, the lost motion member 12d also rotates clockwise by the spring 12f if the lost motion member 12d is not prevented from rotating by the bell crank 11. Namely, when the lost motion member 12d is prevented from rotating as will be described later, only the arm body 12c can be rotated in the clockwise direction.

The bell crank 11 has a deep recess 11c and a contact portion 11d which is semispherically recessed. When the slide bar 7 moves to the right with the arm 12 rotated counterclockwise by the spring 31, a portion of the lost motion member 12d including the tip portion 12a is received in the deep recess 11c of the bell crank 11, as shown in FIG. 1, so that rightward movement of the slide bar 7 does not cause the bell crank 11 to rotate counterclockwise. On the contrary, when the slide bar 7 moves to the right with the arm 12 rotated clockwise by the plunger 23a of the solenoid 22, the tip portion 12a of the lost motion member abuts against the semispherically recessed portion 11d as known in FIG. 2. Namely, as the slide bar 7 moves rightwards, the tip portion 12a is engaged with the semispherically recessed portion 11d so that the rightward movement of the slide bar 7 causes the bell crank 11 to rotate counterclockwise.

As described in the above, the slide bar 7 is movable between two positions in the directions A and B, and when the slide bar 7 moves to the left to assume its left most position, the tip portion 12a of the lost motion member 12d will be spaced from the bell crank 11.

Turning back to FIG. 1, a kick arm 13 is pivotally supported on the chassis, and has a portion abutting against a recessed portion 14 of the control wheel 6. The kick arm 13 is biased by means of a spring 15 so that the kick arm 13 tends to rotate clockwise applying a clockwise force to the control wheel 6. The control wheel 6 has an annular wall (not shown for simplicity) along the circumpherence on the upper surface thereof, and the recessed portion 14 is made at a portion of the annular wall. The kick arm 13 is arranged to be normally received in the recessed portion 14, and slides along the outer surface of the annular wall as the control wheel 6 rotates.

Since the lower or right end 16a of the stop lever 16 abuts against a lug 17 which projects from the annular wall of the control wheel 6, the control wheel 6 is prevented from rotating. With the control wheel 6 in this position, the flywheel gear 3 faces the nontoothed portion 18 of the control wheel 6 so that driving force from the flywheel gear 3 is not applied to the control wheel 6 keeping the same stationary.

A lock lever 19 is pivotally mounted on the chassis, and is biased counterclockwise by the spring 15 which is connected to the above-mentioned kick lever 13 at one end thereof. The lock lever 19 has a right end 19b arranged to be engaged with a stepped portion 7a of the slide bar 7, and a left end 19a arranged to be kicked by a lug 20 provided on the upper surface of the control wheel 6. Namely, the lock lever 19 locks the slide bar 7 at its right-most position as shown in FIG. 1 because the lock lever 19 is biased by the spring 15 counterclockwise. As will be described later, when the control wheel 6 rotates clockwise, the lug 20 comes into contact with the left end 19a of the lock lever 19 to kick the same causing the lock lever 19 to rotate clockwise, and thus the right end 19b of the lock lever 19 will be disengaged from the stepped portion 7a of the slide bar 7. As a result, the locking of the slide bar 7 is cancelled so that the slide bar 7 moves to the left, i.e. in the direction A, by the force of the return spring 8.

A latch lever 21 and a latch-release lever 22 are rotatably supported on the chassis coaxially with the stop lever 16. A spring 32 is connected between the stop lever 16 and the latch-release lever 22 so that the latch-release lever 22 is biased clockwise with respect to the stop lever 16. The latch-release lever 22 has a pin engaged with a slot made in the latch lever 21 which is biased counterclockwise by a spring (not shown). The latch lever 21 has a rotary pin 21a at its tip portion which can be engaged with a stepped portion 34 of the carrier plate 10. The latch lever 21 will hold the carrier plate 10 at an intermediate position between the first and second positions so that the tape recorder assumes pause mode as will be described later. Unless the stop lever 16 is in clockwise rotated position, the latch-release lever 22 is arranged to be kicked by the lug 20 of the control wheel 6 as the control wheel 6 rotates to cause the latch lever 21 to rotate counterclockwise so that the rotary pin 21a of the latch lever 21 is remote from the stepped portion 34 of the carrier plate 10.

The above-mentioned stop lever 16 which prevents the control wheel 6 from rotating clockwise, is rotatably supported on the chassis coaxially with the latch lever 21 and the latch-release lever 22, and is biased counterclockwise by a spring 29. The stop lever 16 has a left end arranged to be engaged with the plunger 23a of the solenoid 23, and the above-mentioned right end 16a arranged to come into contact with the lug 17 of the control wheel 6. While the solenoid 23 is being deenergized, the stop lever 16 assumes the position illustrated in FIG. 1, abutting against the lug 17 to prevent the control wheel 6 from rotating clockwise agaisnt the force of the spring 15, which force is applied via the kick arm 13.

The solenoid 23 is mounted on the chassis and is arranged to be energized in response to a pulse applied thereto. As the solenoid 23 is energized, the plunger 23a thereof is attracted toward the solenoid body to rotate both the stop lever 16 and the arm 12 clockwise. As the stop lever 16 rotates clockwise, the latch-release lever 22 is pulled by the spring 32 to rotate clockwise. The latch lever 21 is also pulled by the latch-release lever, thus the pin 21a of the latch lever 21 rotates clockwise. As soon as the stop lever 16 starts rotating clockwise, the right end 16a is disengaged from the lug 17 of the control wheel 6, and thus the control wheel 6 is kicked by the kick arm 13 to rotate a given angle. The toothed portion of the control wheel 6 thus engages with the flywheel gear 3 to receive a continuous rotational force from the motor 4 via the flywheel 1. As a result, the control wheel 6 rotates fully once until the nontoothed portion 18 again faces the flywheel gear 3.

Figure 3:
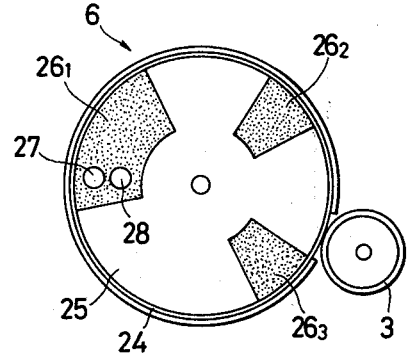
FIG. 3 is a bottom plan view of the control wheel shown in FIG. 1.

Reference is now made to FIG. 3 which is a bottom plan view of the control wheel 6. The control wheel 6 has a light-receiving disk 24 with light-reflecting portion 25, and a plurality of light-absorbing or non-reflecting portions $26_1$ to $26_3$. The light-receiving disk 24 is attached to the lower surface of the control wheel 6. The reflecting portion 25 is metallic lustered, while the nonreflecting portions $26_1$ to $26_3$ are black. A light-emitting diode 27, which functions as a light source, and a photo transistor 28, which functions as a detector, are respectively disposed on the chassis so as to face the light-receiving disk 24. A light beam emitted from the light-emitting diode 27 will be reflected at the reflecting portion 25 of the disk 24, and thus the reflected beam will be received by the photo transistor 28. The combination of the light-emitting diode 27, the light-receiving disk 24 and the photo transistor 28 is used for detecting the rotational angle of the control wheel 6 as will be described later.

Figure 6:
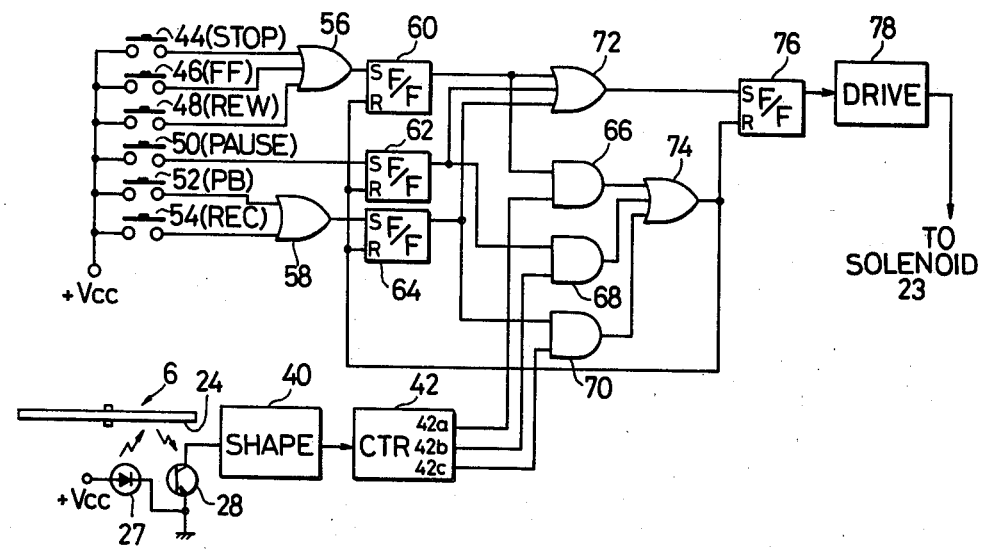
FIG. 6 is a schematic block diagram of an electrical circuit for controlling the energization interval of the solenoid of FIG. 1.

Referring to FIG. 6, which shows a schematic block diagram of the electrical circuit which is a part of the operating mode switching mechanism according to the present invention, the above-mentioned light-emitting diode 27 is supplied with power via an unshown switch to emit light. The light beam emitted from the diode 27 is then reflected at the disk 24 of the control wheel 6 so as to be received by the photo transistor 28. The output signal of the photo transistor 28 is supplied to a waveform shaping circuit 40 in which a pulse is generated as each of the nonreflecting portions $26_1$ to $26_3$ passes through the light beam from the light-emitting diode 27. Namely, the number of pulses emitted from the shaping circuit 40 during the full turn of the control wheel 6 is one of 1, 2 and 3 depending on the rotational angle thereof. A counter 42 is responsive to the output pulse or pulses from the waveform shaping circuit 40 to count the number thereof, and has three output terminals 42a, 42b and 42c. When a first pulse is detected, the logic level at the first output terminal 42a turns to logic "1". In the same manner, as the second and third pulses are detected, the logic levels at the second and third output terminals 42b and 42c respectively turn to logic "1". The three output terminals of the counter 42 are respectively connected to input terminals of three AND gates 66, 68 and 70.

On the other hand, six push-button types normally-open keys or switches 44, 46, 48, 50, 52 and 54 are provided, where one terminal of each of the keys 44 to 54 is connected to a power supply +Vcc. These keys 44 to 54 are used to select a desired operating mode of the tape recorder, and are respectively named stop key, first forward (EF) key, rewind(REW) key, pause key, playback(PB) key, and record(REC) key. The other terminal of each of the keys 44 and 54 is connected to an unshown circuit which controls the operation of the motor 4, the aforementioned another motor for driving the take up and pay off reel wheels 36 and 35, and the recording/reproducing amplifier or the like. The stop key 44, fast forward key 46 and the rewind key 48 are respectively connected to input terminals of an OR gate 56, while the playback key 52 and record key 54 are respectively connected input terminals of another OR gate 58. The output terminals of the OR gate 56 and 58 are respectively connected to set input terminals S of first and third flip-flops 60 and 64, while the pause key 50 is directly connected to a set input terminal S of a second flip-flop 62. The output terminals of the flip-flop 60 to 64 are respectively connected to the other input terminal of the respective AND gates 66 to 70, and are further connected respectively to input terminals of an OR gate 72. The output terminals of the AND gates 66 to 70 are connected to input terminals of an OR gate 74 whose output terminal is connected to a reset terminal R of a flip-flop 76, and to reset terminals R of the flip-flops 60 to 64. The output terminal of the OR gate 72 is connected to a set terminal of the flip-flop 76 whose output terminals is connected to a drive circuit 78 arranged to drive the solenoid 23.

The circuit of FIG. 6 operates as follows. Assuming that the tape recorder is first in a playback mode, and now a stop key 44 is depressed, a logic "1" signal is applied via the OR gate 56 to the set terminal S of the flip-flop 60. Thus the flip-flop 60 produces a logic "1" output signal, which is applied via the OR gate 72 to the set terminal S of the flip-flop 76. Accordingly, the flip-flop 76 produces a logic "1" output signal to trigger the drive circuit 78. With this operation, the solenoid 23 is energized to rotate the stop lever 16 clockwise. Accordingly, the control wheel 6 starts rotating clockwise. When the control wheel 6 is stationary as shown in FIG. 1 and FIG. 3, the light-emitting diode 27 and the photo transistor 28 both face the nonreflecting portion $26_1$. Therefore, the output signal level of the photo transistor 28 is kept low before the control wheel 6 starts rotating. As the control wheel 6 has rotated a given angle corresponding to the arc of the nonreflecting portion $26_1$, and as soon as the reflecting portion 25 faces the light-emitting diode 27 and the photo transistor 28, the output signal level of the photo transistor 28 turns high. Thus a single pulse is applied to the counter 42 causing a logic "1" signal to be applied to the AND gate 66 from the first output terminal 42a. The AND gate 66 is thus enabled to transmit a logic "1" signal via the OR gate 74 to the reset terminal R of the flip-flop 76. The flip-flop 76 as well as the flip-flop 60 is reset to produce a logic "0" output signal. The drive circuit 78 deenergizes the solenoid 23 in response to the logic "0" signal from the flip-flop 76.

From the above, it will be understood that the solenoid 23 is energized for an interval defined by the duration of logic "1" or on-state of the flip-flop 76. Namely, the solenoid 23 is energized immediately after the stop key 44 is manipulated, and is deenergized when the control wheel 6 has rotated a predetermined angle. When the fast forward key 46 or the rewind key 48 is manipulated, the exact the same operation as described in the above will be performed. In the same manner, if one of the remaining keys 46 to 54 is manipulated, the solenoid 23 is immediately energized to cause the rotary control wheel 6 to start rotating. However, the solenoid 23 will be continuously energized until a second pulse from the shaping circuit 40 is applied to the counter 42 in the case of the pause key 50, and until a third pulse is applied to the same in the case of the playback key 52 or record key 54. In other words, the solenoid 23 is deenergized when the second nonreflecting portion $26_2$ of the control wheel 6 has passed through the light beam after the pause key 50 is operated. In the case of the playback key 52 or record key 54, the solenoid 23 is deenergized when the third nonreflecting portion $26_3$ has passed through the light beam.

Summarizing the operation of the circuit of FIG. 6, the solenoid 23 is energized as soon as of the keys 44 to 54 is manipulated to cause the control wheel 6 to start rotating. If the manipulated key is one of the stop key 44, fast forward key 46 and rewind key 46, the solenoid 23 is deenergized when the control wheel 6 has rotated a first predetermined angle. If the manipulated key is the pause key 50, the solenoid 23 is deenergized when the control wheel 6 has rotated a second predetermined angle which is greater than the first predetermined angle. Furthermore, if the manipulated key is the playback key 52 or record key 54, the solenoid 23 is deenergized when the control wheel 6 has rotated a third predetermined angle which is greater than the second predetermined angle.

Figure 7:
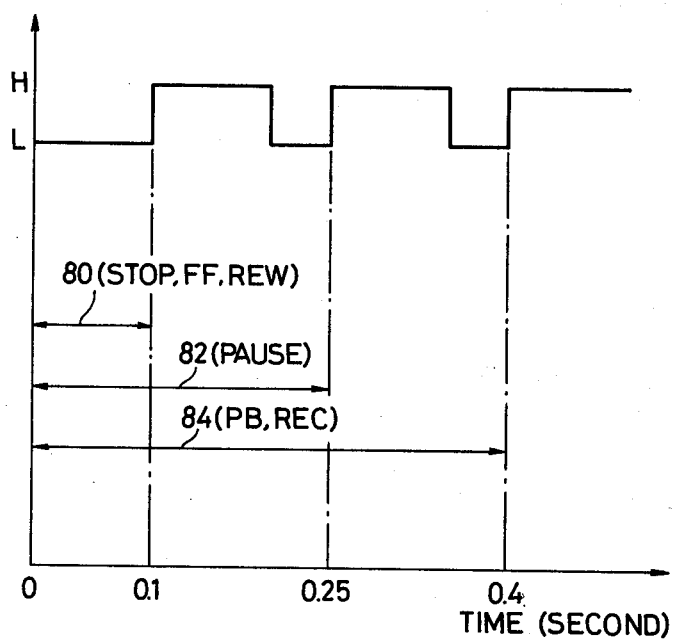
FIG. 7 is an explanatory timing chart useful for understanding the operation of the embodiment of the operating mode switching mechanism according to the present invention.

FIG. 7 is a timing chart showing the output pulses of the waveform shaping circuit 40 of FIG. 6 and respective intervals for which the solenoid 23 is being energized depending on the selected key. The output signal of the shaping circuit 40 assumes a low level L when the light-emitting diode 27 and the photo transistor 28 of FIGS. 3 and 6 face the nonreflecting portion $26_1$, $26_2$, or $26_3$ and assumes a high level H when facing the reflecting portion 25. Solenoid energizing intervals are respectively represented by three lines 80, 82 and 84. In detail, for setting the tape recorder in stop, fast forward or rewind mode the solenoid 23 is energized for a short period of time, such as 0.1 second; for setting in pause mode, for an intermediate period of time, such as 0.25 second; and for setting in playback or record mode, for a long period of time, such as 0.4 second. The above values of respective intervals, however, are variable in accordance with the rotational speed of the control wheel 6 and the pattern of the light-receiving disk 24.

Figure 5:
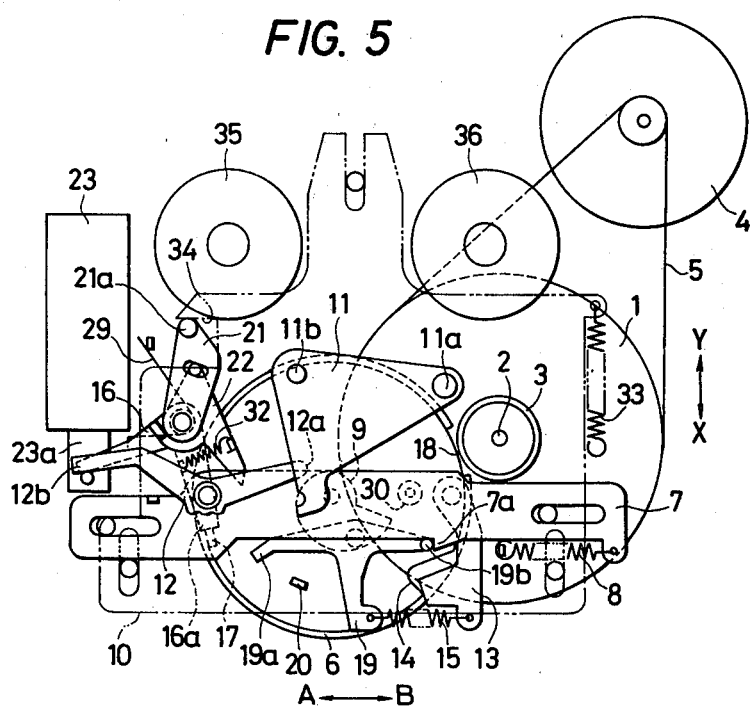
FIG. 5 is a schematic top plan view of the tape recorder in pause mode.

The mechanical operation of the operating mode switching mechanism will be described with reference to FIGS. 4 and 5. FIG. 4 shows the tape recorder which is in playback mode. Let us assume that the playback key 52 of FIG. 6 is manipulated when the tape recorder is in stop mode shown in FIG. 1. The solenoid 23 is immediately energized as described in the above causing the stop lever 16 to rotate clockwise against the return spring 29 so that the right or lower end 16a of the stop lever 16 disengages from the lug 17 provided on the upper surface of the control wheel 6. Accordingly, the control wheel is rotated clockwise by the kick arm 13, and subsequently, it rotates because of the rotational force applied from the flywheel gear 3. As the control wheel 6 rotates, the lug 20 on the upper surface of the control wheel 6 kicks the left end 19a of the lock lever 19 to rotate the same clockwise. As a result, the right end 19b of the lock lever 19 is disengaged from the stepped portion 7a of the slide bar 7 so that the slide bar 7 returns in the direction A by the force of the return spring 8. When the slide bar 7 reaches its left-most position, the pin 30 of the slide bar 7 is in contact with the cam 9 of the control wheel 6. As the control wheel 6 keeps rotating, the pin 30 is depressed rightwards by the periphery of the cam 9. Namely, the slide bar 7 is moved to the right, i.e. in the direction B. After the slide bar 7 is moved to the right-most position of FIG. 3, the slide bar 7 is again locked by the lock lever 19.

On the other hand, turning back to the point of energization of the solenoid 23, the arm body 12c of the arm 12 is rotated clockwise by the plunger 23a of the solenoid 23 (see FIG. 2). At this time, the tip portion 12a of the lost motion member 12d is received in the deep recess 11c of the bell crank 11, and therefore, the lost motion member 12d does not rotate. However, when the slide bar 7 assumes its left-most position as described in the above, the tip portion 12a of the lost motion member 12d leaves from the recess 11c. As soon as the tip portion 12a gets out of the recess 11c, the lost motion member 12d rotates clockwise by the spring 12f to assume the position of FIG. 2. As the slide bar 7 moves rightwards by the rotation of the cam 9, the tip portion 12a comes into contact with the semispherical recess 11d of the bell crank 11. The slide bar 7 further moves rightwards so that the bell crank 11 is rotated counterclockwise by the arm 12 which also moves rightwards. The pin 11a of the bell crank 11 is engaged with the carrier plate 10 so that the carrier plate 10 slides in the direction Y as the bell crank 11 rotates counterclockwise. When the slide bar 7 has been moved to the right-most position, the carrier plate 10 assumes the aforementioned second position in which playback or recording operation can be performed.

In the above operation, after the lug 20 kicks the left end 19a of the lock lever 19, the same lug 20 also kicks the right end of the latch-release lever 22 causing the latch-release lever 22 and therefore the latch lever 21 to rotate counterclockwise temporarily. After the lug 20 has passed the right end of the latch-release lever 22, both the latch lever 21 and the latch-release lever 22 rotate clockwise by the force of the spring 32. However, the above-described movement of the latch lever 21 and the latch-release lever 22 does not affect the movement of the carrier plate 10 in the direction Y.

It will be understood from the above, that the solenoid 23 is energized for a relatively long period of time, such as 0.4 second, for setting the tape recorder in playback or record mode. This interval should be longer than an interval in which the tip portion 12a of the lost motion member 12d of the arm 12 abuts against the semispherical recess 11d of the bell crank 11 after the slide bar 7 has started moving rightwards. If the energizing interval were shorter than the above-mentioned interval, namely, if the solenoid 23 where deenergized before the tip portion 12a comes into contact with the semispherical recess 11d, the tip portion 12a would enter into the deep recess 11c and thus the bell crank 11 would remain stationary.

Now, let us assume that the stop key 44 is manipulated during playback or record mode. The solenoid 23 is energized to rotate the stop lever 16 clockwise in the same manner as described in the above. The control wheel 6 starts rotating clockwise so that the lug 20 kicks the lock lever 19, and thus the slide bar 7 rapidly returns to the left-most position temporarily. With the leftward movement of the slide bar 7, the arm 12 is disengaged from the semispherical recess 11d of the bell crank 11, and thus the carrier plate 10 returns to the first position in the direction of X by the spring 33. After disengaged from the semispherical recess 11d, the arm body 12c and the lost motion member 12d of the arm 12 are rotated counterclockwise by the spring 31. Therefore, when the slide bar 7 moves to the right by the rotation of the cam 9 of the control wheel 6, the tip portion 12a of the lost motion member 12d does not engage with the semispherical recess 11d but enters into the deep recess 11c. As a result, the bell crank 11 and therefore the carrier plate 10 does not move by the rightward movement of the slide bar 7. From the above, it will be understood that in order to set the tape recorder in stop mode from playback or record mode all required is to energize the solenoid 23 for a relatively short period of time, such as 0.1 second, so that the right end 12a of the stop lever 12 disengages from the lug 17 to make the control wheel 20 rotate clockwise.

Let us suppose that it is intended to set the tape recorder in pause mode from playback or record mode. The pause key 54 of FIG. 6 is first operated to energize the solenoid 23. The solenoid 23 is thus energized for an interval which is longer than the above-mentioned short period of time but is shorter than the above-mentioned long period of time. In this embodiment, the solenoid 23 is energized for an intermediate interval, such as 0.25 second. With this operation, the latch-release lever 22 and the latch-lever 21 are both held at the clockwise rotated position until the left end 19a of the lock lever 19 is kicked by the lug 20 of the control wheel 6. Therefore, although the carrier plate 10 tends to return to the first position as described in the above, the pin 21a of the latch lever 21 is located at such a position that the stepped portion 34 of the carrier plate 10 abuts thereagainst. As a result, the carrier plate 10 is prevented from returning to the first position on the way thereto. Furthermore, the energization of the solenoid 23 is kept so that the latch-release lever 22 is evacuated from the locus of the lug 20. Therefore, the latch-release lever 22 is not kicked by the lug 20, thus pause condition is maintained as illustrated in FIG. 5. On pause mode, the carrier plate 10 is at an intermediate position between the first and second positions so that the idler is remote from the capstan 2 preventing the magnetic tape from running. Other mechanical operation is the same as the operation described in connection with the case of setting the tape recorder in stop mode. The above-mentioned intermediate interval for setting the tape recorder in pause mode substantially corresponds to an interval in which the control wheel 6 rotates a given angle, the slide bar 7 rapidly returns to the left-most position, the carrier plate 10 is held by the latch lever 21 on the way to the first position, and the latch-release lever 22 is evacuated from the locus of the lug 20.

In the above-description, it has been described how the tape recorder is set in playback or record mode from stop mode, and is set in stop or pause mode form playback or record mode. When it is intended to set the tape recorder in fast forward mode or rewind mode, the corresponding key 46 or 48 of FIG. 6 is manipulated. In order to perform fast forward reeling or rewinding operation the carrier plate 10 is located at the same position as in stop mode. Namely, the solenoid 23 is energized for the short period of time to perform fast forward reeling or rewinding operation in the same manner as in stop mode, while the one of the reel wheels 35 and 36 is rotated at a high speed by means of an unshown separate drive mechanism.

As described in the above, in the embodiment of the operating mode switching mechanism for a tape recorder according to the present invention, the solenoid 23 is energized for a relatively long period of time for setting the tape recorder in playback or record mode, for an intermediate period for setting the same in pause mode, and for a relatively short period for stopping the same, or setting in either fast forward or rewind mode. Namely, one of three different kinds of pulses is selectively applied to the solenoid 23 in accordance with the selected key, where the interval of each of the pulses is controlled by detecting the rotational angle of the control wheel 6 by using the aforementioned light-emittind diode 27, the light-receiving disk 24 and the photo transistor 28. With this arrangement, the energization interval of the solenoid 23 is synchronized with the rotational angle of the control wheel 6. Consequently, the aforementioned various disadvantages and drawbacks inherent to the technique of the prior application by the inventor are removed.

The above-described embodiment is just an example of the invention, and therefore, it will be understood for those skilled in the art that many modifications and variations may be made without departing from the spirit of the present invention.

What is claimed is:

1. An operating mode switching mechanism for a tape recorder having a movable carrier member carrying thereon an electromagnetic transuducer and movable between first and second positions, a tape driving mechanism arranged to drive a magnetic tape at a constant speed when said carrier member assumes said second position, a plurality of manually operating keys for effecting various operations, and a motor, comprising;
    (a) a single solenoid aranged to be energized by pulses applied thereto in response to the operation of said operating keys;
    (b) a rotary wheel;
    (c) means for locking said rotary wheel at a predetermined angular position and for unlocking the same in response to the energization of said solenoid;
    (d) means for rotating said rotary wheel after unlocked so that said rotary wheel provides a 360 degree revolution from said predetermined angluar position;
    (e) means responsive to the rotation of said rotary wheel for causing said carrier member to move from said first position to said second position against a biasing force only when said solenoid is being energized until said rotary wheel is rotated by a first predetermined angle;
    (f) means responsive to the rotation of said rotary wheel for locking said carrier member in an intermediate position between said first and second positions only when said solenoid is being energized during the time said carrier member assumes said second position until said rotary wheel is rotated by a second predetermined angle which is smaller than said first predetermined angle;
    (g) means responsive to the rotation of said rotary wheel for causing said carrier member to move from said second position to said first position when said solenoid is being energized until said rotary wheel is rotated by a third predetermined angle which is smaller than said second predetermined angle;

(h) means for detecting the rotational angle of said rotary wheel; and (i) means responsive to the detected angle of said rotary wheel for deenergizing said solenoid when said rotary wheel is rotated by one of said first to third predetermined angles, which has been selected in accordance with said selected operating key.

2. An operating mode switching mechaimsm as claimed in claim 1, wherein said rotational angle detecting means comprises a light source, a light-receiving disk attached to said rotary wheel, a photo detector responsive to a light beam emitted from said light source and reflected at said light-receiving disk, and an electrical circuit responsive to the output signal of said photo detector.

3. An operating mode switching mechanism as claimed in claim 2, wherein said light source comprises a light-emitting diode, and said photo detector comprises a photo transistor, both said light-emitting diode and said photo detector are stationarily supported to face said light-receiving disk.

4. An operating mode switching mechanism as claimed in claim 3, wherein said light-receiving disk comprises a light-reflecting portion and a plurality of nonreflecting portions.

5. An operating mode switching mechanism as claimed in claim 2, wherein said electrical circuit comprises a waveform shaping circuit responsive to the output signal of said photo detector for producing pulses and a counter responsive to the output pulses from said waveform shaping circuit.

6. An operating mode switching mechanism as claimed in claim 5, wherein said means for deenergizing said solenoid comprises:

(a) a first OR gate responsive to signals from a plurality of said operating keys;

(b) a second OR gate responsive to another plurality of said operating keys;

(c) a first flip-flop responsive to the output signal of said first OR gate;

(d) a second flip-flop responsive to another one of said operating keys;

(e) a third flip-flop responsive to the output signal of said second OR gate;

(f) a third OR gate responsive to the output signals of said first to third flip-flops;

(g) first to third AND gates respectively responsive to the output signals of said first to third flip-flops and to output signals of said counter;

(h) a fourth OR gate responsive to the output signals of said first to third AND gates, the output signal of said fourth OR gate being fed to said first to third flip-flops to reset the same;

(i) a fourth flip-flop responsive to the output signals of said third and fourth OR gates respectively; and (h) a drive circuit responsive to the output signal of said fourth flip-flop for controlling the energization of said solenoid.

7. An operating mode switching mechanism as claimed in claim 1, wherein said means for causing said carrier member to move from said first position to said second position comprises:

(a) a sliding means arranged to move from a third position to a fourth position against a biasing force as said rotary wheel rotates;

(b) an arm member rotatably mounted on said sliding means to assume a given angle as long as said solenoid is energized; and (c) means arranged to be engaged with a portion of said arm for transmitting a force to said carrier member so that said carrier member moves from said first position to said second position as said sliding means moves from said third position to said fourth position.

8. An operating mode switching mechanism as claimed in claim 7, wherein said arm member comprises an arm body arragned to be rotated in a given direction by said solenoid against an opposite biaisng force, and a lost-motion member coaxially pivoted with said arm body and biased in said given direction, said lost-motion member having a tip portion arranged to be engageable with a poriton of said means for transmitting said force to said carrier member.

9. An operating mode switching mechanism as claimed in claim 8, wherein said means for transmitting said force to said carrier member comprises a bell crank pivotally supported and having a recess for receiving said tip portion of said lost-motion member so that said bell crank is rotated as said slide means slides from said third position to said fourth position.

10. An operating mode switching mechanism as claimed in claim 1, wherein said means for locking said rotary wheel comprises a rotatably supported stop lever having one end arranged to be moved in response to the energization of said solenoid so that said locking means rotates, and the other end arranged to come into contact with a portion of said rotary wheel.

11. An operating mode switching mechanism as claimed in claim 1, wherein said rotating means comprises a kick lever rotatably supported and biased in one direction, said kick lever being engaged with a recess made in said rotary wheel when said rotary wheel is locked at said predetermined angular position for applying a force thereto; and a toothed portion arranged along the periphery of said rotary wheel except for a nontoothed portion, said toothed portion being engagable with a gear coaxially connected to a flywheel driven by said motor, said nontoothed portion being arranged to face saod gear when said rotary wheel is locked at said predetermined angular position, said toothed portion being arranged to engage with said gear after said rotary wheel is kicked by said kick lever.

12. An operating mode switching mechanism as claimed in claim 1, wherein said means for locking said carrier member comprises a latch lever and a latch-release lever both coaxially and rotatably supported with said stop lever of said locking means; means for causing said latch-release lever to rotate in a given direction when said stop lever is rotated by the energization of said solenoid; means for causing said latch lever to rotate in the same direction as said given direction when said latch-release lever is rotated in said given direciton; said latch-release lever having a portion arranged to be kicked by a portion of said rotary wheel when said rotary wheel rotates so that said latch-release lever and said latch lever rotate in a direction opposite to said given direction; said latch lever having a portion engageable with a stepped poriton of said carrier member.

13. An operating mode switching mechanism as claimed in claim 7, wherein said means for causing said carrier member to move from said second position to said first position comprises a lock lever rotatably supported and having one end arranged to be kicked by a portion of said rotary wheel when said rotary wheel rotates, and the other end arranged to be engaged with a stepped portion of said sliding means when said sliding means assumes said fourth position; and means for biasing said lock lever in a given direction so that said lock lever keeps locking said sliding means until said lock lever is kicked by said portion of said rotary wheel, said carrier member being returned to said first position by said biasing force applied thereto when said sliding means returns to said third position by said biasing force applied to said sliding means after unlocked.

* * * * *